June 12, 1923.
S. BOWMAN
1,458,321
WATER COOLING APPARATUS FOR GAS ENGINES
Filed March 1, 1920     2 Sheets-Sheet 1
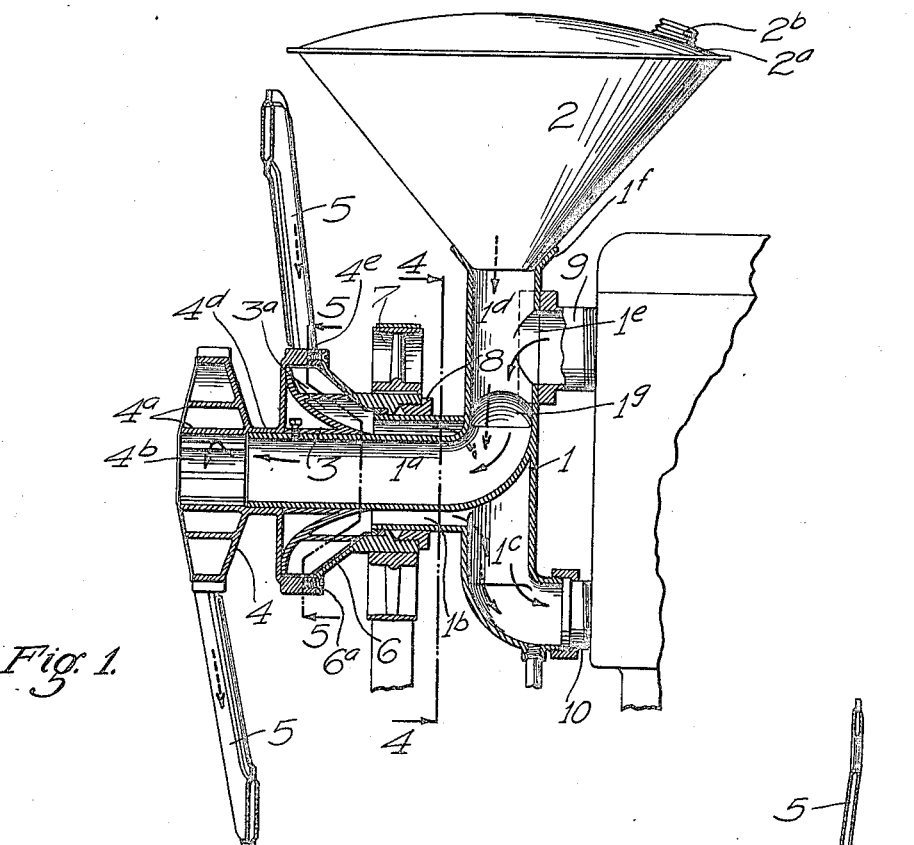
INVENTOR.
SAMUEL BOWMAN.
BY A. B. Bowman
ATTORNEY June 12, 1923.

S. BOWMAN 1,458,321

WATER COOLING APPARATUS FOR GAS ENGINES

Filed March 1, 1920  2 Sheets-Sheet 2

INVENTOR.
SAMUEL BOWMAN.
BY
ATTORNEY

Patented June 12, 1923.

1,458,321

UNITED STATES PATENT OFFICE.

SAMUEL BOWMAN, OF REDONDO BEACH, CALIFORNIA.

WATER-COOLING APPARATUS FOR GAS ENGINES.

Application filed March 1, 1920. Serial No. 362,406.

*To all whom it may concern:*

Be it known that I, SAMUEL BOWMAN, a citizen of the United States, residing at Redondo Beach, in the county of Los Angeles and State of California, have invented certain new and useful Improvements in Water-Cooling Apparatus for Gas Engines, of which the following is a specification.

My invention relates to a fan through which the water from an internal combustion engine is circulated for cooling said water and the objects of my invention are: First, to provide an apparatus in the form of a fan and conductors through which water from the water jackets of an engine is circulated for cooling purposes; second, to provide an apparatus of this class wherein the water is forced outwardly by means of centrifugal force in the revolution of the fan and is drawn inwardly by a pump operated with the revolution of the fan; third, to provide an apparatus of this class wherein the fan, water and circulating means is mounted in connection with the engine and separate and apart from the frame of the vehicle; fourth, to provide an apparatus of this class in which the water is permitted to siphon without passing through the fan blades when the engine is or is not in operation; fifth, to provide an apparatus of this class in which the water circulates inwardly and outwardly in the separate blades of the fan and sixth, to provide an apparatus of this class which is simple and economical of construction, durable, easy to install, automatic in its action and which will not readily deteriorate or get out of order.

With these and other objects in view as will appear hereinafter my invention consists of certain novel features of construction, combination, and arrangement of parts and portions as will be hereinafter described in detail and particularly set forth in the appended claims, reference being had to the accompanying drawings and to the characters of reference thereon which form a part of this application in which:

Figure 1 is a sectional view of the apparatus shown mounted on an engine block and showing some of the parts in elevation to facilitate the illustration.

Figure 2 is a fragmentary front view of the fan and showing the water segregating blades in section to facilitate the illustration.

Figure 3 is a sectional view through 3—3 of Fig. 2.

Similar characters of reference refer to similar parts and portions throughout the several views of the drawings.

Figure 4:
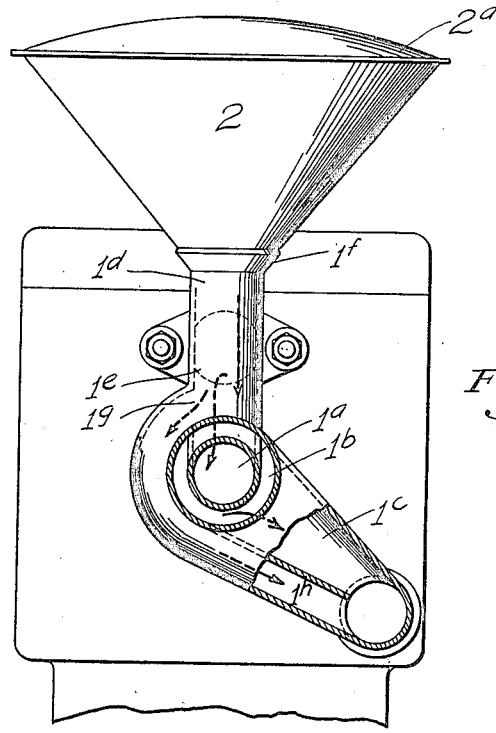
Figure 4 is a sectional view through 4—4 of Fig. 1 and showing some of the portions broken away to facilitate illustration, and Fig. 5 a fragmentary sectional view through 5—5 of Fig. 1.
Figure 5:
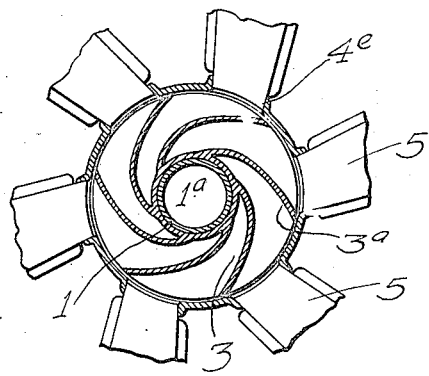

The water conducting member and support 1, reservoir 2, centrifugal pump blades 3, revoluble fan blade support 4, fan blades 5, revoluble journal member 6, sheave 7, stuffing box gland 8, conductor 9 and conductor 10, constitute the principal parts and portions of my water cooling fan. The conducting member and support 1 is a pipe shaped casting member consisting of an L member consisting of horizontal portion $1^a$ and a vertical portion $1^d$ and with an enlarged extension $1^b$ extending around the portion $1^a$ thereof provided with an offset extension $1^c$ at right angles to the portion $1^a$ and in line with the portion $1^d$. This portion $1^c$ communicates with and is supported on the conductor 10 which is the cool water inlet to the engine and the portion $1^d$ is provided with a side aperture $1^e$ which communicates with and is supported on the conductor 9 which is the hot water outlet conductor from the engine. The upper end of the portion $1^d$ of the conductor member 1 is provided with an outwardly and upwardly flanged portion $1^f$ to which is secured the reservoir 2, which is preferably a metallic inverted cone shaped reservoir member which is provided with a cap $2^a$ thereon which is provided with a small threaded extension adapted for a cap $2^b$ for the purpose of facilitating the filling of the reservoir 2. Secured adjacent to the normally horizontal portion $1^a$ of the member 1 near the end thereof is a centrifugal pump blade member 3 provided with a plurality of blades $3^a$ and revolubly mounted over the end of the portion $1^a$ and adapted to fit against the member 3 is the revoluble fan blade support 4 which consists of a hollow extended portion provided with a plurality of curved partitions $4^a$ which extend from the outer side to an annular ring 4$^b$ in the center. The outer edge of this member 4 is provided with a plurality of apertures 4$^c$ in which are mounted one side of the inner ends of the fan members 5 and between these members 4$^a$ are apertures for providing communication between the interior of the portion 1$^a$ and the spaces between the members 4$^a$. This member 4 is provided with a contracted portion 4$^d$ which serves as a journal on the end of the portion 1$^a$, then extends outwardly, then backwardly at a right angle and to this right angle portion 4$^e$ is secured the journal member 6 by means of screws 6$^a$. This member 6 is contracted forming a tapering channel between its wall and its blades 3$^a$ and this member 6 is revolubly mounted around the enlarged portion 1$^b$ of the member 1 and between said member 6 and the member 1$^b$ is a stuffing box gland 8 for forming a tight joint between the member 6 and the portion 1$^b$. Secured on the outer surface of the member 6 is a sheave 7 which is the main drive sheave for driving the fan. The fan blades 5 are hollow and divided in the middle providing for the passage of water around this middle portion so that the water circulates outwardly in one side and inwardly in the other side. The one side communicates with the outer portion of the member 4 and the other side communicates with the portion 4$^e$ of the member 4. The conductor portion 1$^d$ is provided with an aperture 1$^g$ in the one side which permits the water to pass around the portion 1$^a$ of the pipe 1 and down through a channel 1$^h$ shown best in Fig. 4 to the conductor 10 thus providing for siphoning the water from the upper conductor 9 to the lower conductor 10 while the engine is not operating or it may so siphon when the fan is running.

The operation of the device is as follows:

The engine, conductor, fan blades and reservoir 2 are all filled with water through the cap 2$^b$. When the engine is started the sheave 7 is revolved by a shaft in connection with the main shaft of the engine in the same manner as the conventional fan, causing the members 6 and 4, and fan blades 5 to revolve around the forwardly extended portion of the tube 1 the revolution of the fan causing an outward pressure by the centrifugal force of the water causes it to move outwardly in the one side of the blades while the centrifugal pump blades 3$^a$ draw it inwardly on the other sides where it passes into the engine through the conductor 10 through the engine and out through the conductor 9 and the operation is repeated.

It will be noted that the fan and reservoir are supported upon the conductor 9 and 10 secured to the engine so there is no relative connection between the water cooler and the frame of the vehicle.

Though I have shown and described a particular construction, combination, and arrangement of parts and portions I do not wish to be limited to this particular construction, combination, and arrangement but desire to include in the purview of my invention the construction, combination and arrangement substantially as set forth in the appended claims.

It is obvious that with this construction there is provided a means for circulating water through the fan blades for cooling water in the water jacket of an engine in which the water is circulated outwardly in the fan blades by means of centrifugal force and inwardly by pump operated by the revolution of the fan. That there is provided means for storing a supply of water at a sufficient level to supply the engine water jacket at all times and that there is also provided means for siphoning the water from the upper side to the lower side of the engine in addition to the fan operation.

Having thus described my invention what I claim as new and desire to secure by Letters Patent is:

1. A water cooling apparatus for gas engines, including a combined support and water conductor communicating with the water inlet and outlet of the gas engine, a water reservoir communicating with said conductor, a fan revolubly mounted on said support and conductor provided with hollow blades divided in the middle and communicating with said conductors forming a continuous water circulating medium, a centrifugal pump member secured to a portion of said conductor forming a pump with said fan.

2. A water cooling apparatus for gas engines, including a combined support and water conductor communicating with the water inlet and outlet of the gas engine, a water reservoir communicating with said conductor, a fan revolubly mounted on said support and conductor provided with hollow blades divided in the middle and communicating with said conductor forming a continuous water circulating medium, a centrifugal pump member secured to a portion of said conductor forming a pump with said fan and means for revolving said fan.

3. A water cooling apparatus for gas engines, including a combined support and water conductor communicating with the water inlet and outlet of the gas engine, a water reservoir communicating with said conductor, a fan revolubly mounted on said support and conductor provided with hollow blades divided in the middle and communicating with said conductor forming a continuous water circulating medium, a centrifugal pump member secured to a portion of said conductor forming a pump with said fan means for revolving said fan and a by-pass in connection with said conductor and support whereby the water may be by-passed from the outlet to the inlet of said engine by siphonic action and independent of the circulation through the fan blade.

4. A water cooling apparatus for gas engines, including a hollow bladed revoluble fan provided with out-going and in-coming water passage ways in each blade, a conductor connecting the outlet of a gas engine with the interior of one side of said fan blades, a plurality of stationary centrifugal pump blades with their outer edges contiguous with the outlet only from said fan blades, and another conductor connecting said pump blades with the inlet to said gas engine.

5. A water cooling apparatus for gas engines, including a hollow bladed revoluble fan provided with out-going and in-coming water passage ways in each blade, a conductor connecting the outlet of a gas engine with the interior of one side of said fan blades, a plurality of centrifugal pump blades contiguous with the outlet from said fan blades, another conductor connecting said pump blades with the inlet to said gas engine and a by-pass connecting said outlet from said engine with the inlet of said engine independent of the water passage ways in said fan, whereby the water may be by-passed from the outlet to the inlet of said engine by siphonic action and independent of the circulation through the fan blades.

In testimony whereof, I have hereunto set my hand at Redondo Beach, California, this 14th day of February, 1920.

SAMUEL BOWMAN.